M1142 OR X 7,711 BEST AVAILABLE COPY
W. Woolley
Window Cornice and Frieze,
No 7711 X
Patented Aug. 13, 1833.
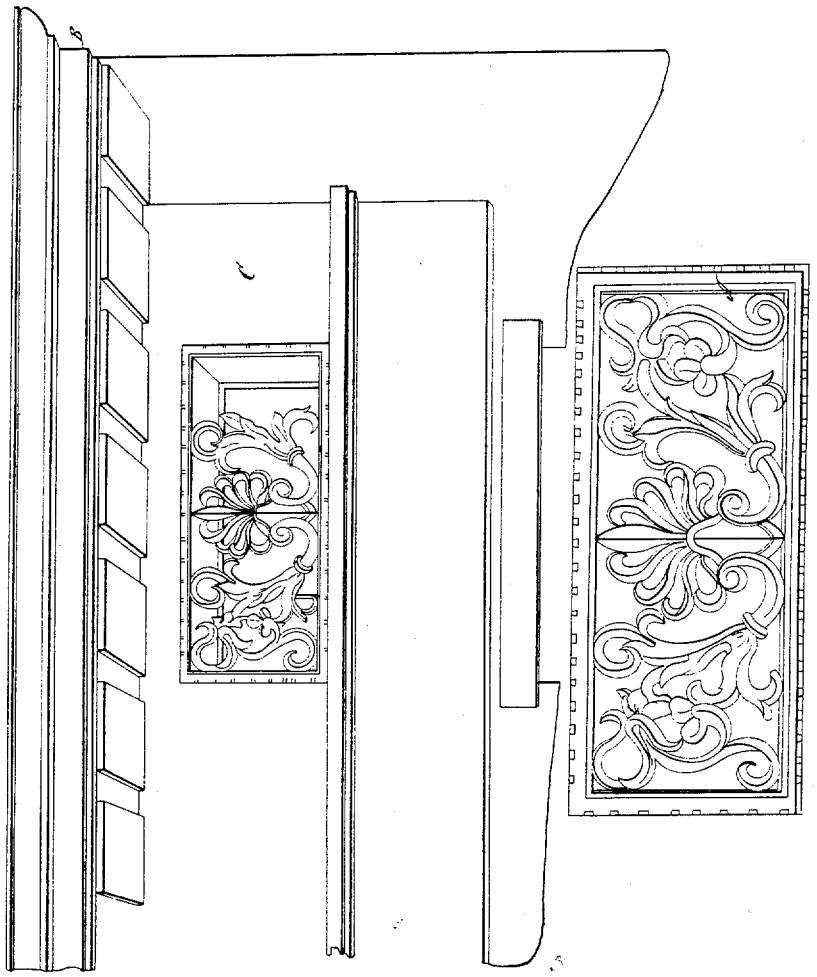
137
N. PETERS, PHOTO-LITHOGRAPHER, WASHINGTON, D. C.

7711X August 13, 1833

Aug. [illegible]. 1833 49.

Williams Woolley.
Letters Patent. (Patented Aug 13 1833)

The Schedule referred to in these Letters Patent, and making part of the same, containing a description in the words of the said Williams Woolley himself of his improvement in the construction of a Frieze Window and Covering.

---

This improvement by putting a window in the frieze under the cornice, is intended to avoid the necessity of resorting to the Dormar window, which is both expensive and inconvenient. The frieze window is an improvement invented by me several years since, and has since gone into very general use in good buildings in the City of New York, and elsewhere. In this window, I have made an improvement, and it is this improvement for which I ask a Patent, And it consists in covering it with a metallic or cast iron blind or shade, constructed in such a manner as to conceal the window, while it ornaments the frieze of the cornice, and admits light and air sufficient for the room. For a house, shewing twenty-five feet front, the frieze window should be about three feet six inches by twenty-two inches running lengthwise with the frieze of the cornice, as shewn in the drawing. This window may be varied in size, or proportion according to the size and situation of the other windows in the same front, and according to the taste of the Artist. The blind or shade is made just large enough to cover the opening made for the window and may be screwed on, or let in according to the taste of the Artist. This blind is ma[illegible] in the best and cheapest manner of cast iron, but may be made of any other material. To let in light and air, all that part covering the opening left for the window is open work, carved and ornamented according to the taste of the Artist, or it may be made in open lattice work if preferred. When put up it is well painted, and resembles the wood or frieze of the cornice in which the window is inserted. The blind may be hung on hinges if preferred. The drawing which accom-

7711X panies this specification shows fully the blind and how it is applied to the window in the frieze. This iron blind may be made of carved work representing whatever the fancy of the proprietor may suggest, and when finished and painted, will exactly resemble wood and be much more durable, and much cheaper. The above described blind, cast from iron, or other material, and so constructed as to admit sufficient light and air while it hides or shades the window and forms an elegant ornament in the frieze of the cornice, I claim as my invention and improvement.

In testimony whereof, I have hereunto set my hand and seal in the presence of two witnesses.

Witnesses
Asiel Gray
P. M. Van Cott (Dr in portfolio)

William Woolley

Exd. W.J.C.
(539 words)